(12) United States Patent
Borrell (10) Patent No.: US 11,622,572 B2
(45) Date of Patent: Apr. 11, 2023

(54) MACHINE FOR INTEGRAL PROCESSING OF FRUITS WITH A HARD OR SOFT SHELL

(71) Applicant: Jose Borrell S.A., Denia (ES)

(72) Inventor: Jose Vicente Roig Borrell, Denia (ES)

(73) Assignee: Jose Borrell S.A.

( * ) Notice: Subject to any disclaimer, the term of this patent is extended or adjusted under 35 U.S.C. 154(b) by 378 days.

(21) Appl. No.: 16/738,467

(22) Filed: Jan. 9, 2020

(65) Prior Publication Data
US 2020/0253262 A1  Aug. 13, 2020

(30) Foreign Application Priority Data
Jan. 9, 2019  (ES) .............................. ES201930027U (51) Int. Cl.
*B07B 1/22*  (2006.01)
*B07B 1/20*  (2006.01)
*B07B 1/46*  (2006.01)
*A23N 15/06*  (2006.01)
*A23N 7/10*  (2006.01)

(52) U.S. Cl.
CPC ............... *A23N 15/06* (2013.01); *A23N 7/10* (2013.01); *B07B 1/22* (2013.01)

(58) Field of Classification Search
CPC .. A23N 15/06; A23N 7/10; B07B 1/12; B07B 1/20; B07B 1/22; B07B 1/4609; B07B 1/4618; B07B 1/4636; B07B 1/24; B07B 1/528; B07B 1/54
USPC ........... 99/581; 209/300, 394, 395, 281, 283
See application file for complete search history.

(56) References Cited

U.S. PATENT DOCUMENTS

| | | | | |
|---|---|---|---|---|
| 588,854 A * | 8/1897 | Chambers | ................. | B07B 1/20 |
| | | | | 209/408 |
| 1,021,979 A * | 4/1912 | Fisher | ...................... | B07B 1/22 |
| | | | | 209/394 |
| 4,062,985 A * | 12/1977 | Amstad | .................... | A23N 7/02 |
| | | | | 426/483 |
| 6,516,714 B2 * | 2/2003 | Warmack | ................. | A23N 5/00 |
| | | | | 99/574 |
| 6,609,617 B1 * | 8/2003 | Slayer | ...................... | B07B 1/18 |
| | | | | 209/379 |

FOREIGN PATENT DOCUMENTS

| | | |
|---|---|---|
| ES | 1062979 Y | 8/2006 |
| ES | 1068167 Y | 9/2008 |
| ES | 1077665 Y | 9/2012 |

* cited by examiner

*Primary Examiner* — Michael McCullough
*Assistant Examiner* — Molly K Devine
(74) *Attorney, Agent, or Firm* — St. Onge Steward Johnston & Reens LLC (57) ABSTRACT

The machine for integral processing of fruits with a hard or soft shell disclosed herein comprises a feed hopper and at least a first receptacle having a first end for connection to said hopper and a second opposite end. The receptacle is positioned horizontally according to the longitudinal direction of the machine and comprises in its interior a central shaft positioned in accordance to the longitudinal direction of the machine and connected at one end to a rotating element.

12 Claims, 7 Drawing Sheets

MACHINE FOR INTEGRAL PROCESSING OF FRUITS WITH A HARD OR SOFT SHELL

FIELD OF THE INVENTION

The present invention corresponds to the technical field comprised in the industrial sector of for integral processing of fruits with a hard or soft shell.

BACKGROUND OF THE INVENTION

At present, the processing machines for fruits with a hard or soft shell are known and provided to perform functions of splitter and/or sheller of said fruits, but having certain drawbacks because it is not possible to output in an effective manner the shells and peels generated during said process.

In particular, those machines intended to process fruits with a hard or soft shell comprising a feed hopper and at least one receptacle connected to it, in a horizontal position according to the longitudinal direction of the machine, and which in turn said receptacle comprises in its interior a central rotating shaft arranged according to the longitudinal direction of the receptacle and connected at one end to rotating means, which rotating shaft has finger-shaped elements radially projected towards the exterior from various longitudinal positions on said shaft, which become frequently bogged due to the accumulation of debris such as branch fragments, etc.

This accumulation of these remains reduces the performance of the machine and the effectiveness thereof.

As an example of the prior art, reference documents ES1062979, ES1068167 and ES1077665, owned by the applicant, are mentioned.

Reference document ES1062979 discloses a fruit separating and shelling machine, comprising a frame on which a receptacle to receive and treat the product is supported, fixed on the frame in coincidence with its longitudinal direction. The receptacle has an inlet of the product and an outlet located at the end of the receptacle opposite to the inlet and provided for extraction and collection of waste resulting from the fruit shelling and separating operations. Through the interior of the receptacle there is a shaft, supported by end bearings attached to the frame, where said shaft is provided at one of its ends with a pulley through which a rotating movement is communicated to the shaft by means of a drive belt driven by means of a motor.

The receptacle is formed by a series of rods arranged in the form of a spiral having a separation between the spiral threads such that it allows the shelled fruit to exit into a hopper or collection container located under the machine, while the shells, together with the impurities and with hard-shell almonds that normally accompany the soft-shell almonds are directed towards an outlet opening.

In practice, some inconveniences have been observed in connection with the operation of this machine because the almonds with soft shell are normally mixed with a certain percentage of almonds with hard shell which require a different treatment, and this machine is not able to correctly manage the separation of the amount of hard-shell almonds that accompany the soft-shell almonds.

Reference document ES1068167 shows a machine that tries to solve the problems of the previous machine. This machine consists of a shelling-separating machine, especially for almonds and other fruits with soft-shell, where the extraction of the grain in good quality conditions is carried out at the same time that a controlled separation and expulsion of the percentage of almonds with hard shell existing along with the previous ones is performed.

Said machine, unlike the previous one, has an output for the generated peels and shells at the opposite end of the feed hopper. Said output may be closed by means of a gate whose opening is controlled by means of one or more functional parameters of the machine, thereby achieving to maintain an ideal level of product inside the receptacle and a greater operational efficiency of the machine.

Although this machine was a significant improvement with respect to the operability and functionality of the previous existing machines, in practice it still presented certain inconveniences similar to those of the preceding machine, because frequent jams continued to occur in normal operation of the machine caused when some portions of shells or other foreign matter were embedded between two consecutive threads of the spiral configuration adopted by the receptacle where the partition operation is carried out.

Thus, when there is a jam between the spiral threads of the rods, it is necessary to carry out a cleaning work that requires the machine to be stopped as well as to be partially disassembled in order to provide an access to the interior thereof and perform manual operations of cleaning, descaling the foreign materials or the shells themselves which have become stuck. This generates significant losses of time, with the consequent increase in the production costs that this operation causes.

This problem is generated in part because the space of passage of the fruit between the threads of the rods is constant, not allowing any variation of the same nor with the aim of descaling the stuck materials nor so that the machine can work with different sizes and types of fruit.

Reference document ES1077665 discloses a machine intended to solve the mentioned problem in the previous machines. To do so, the machine has a receptacle consisting of a multiplicity of concentric rings, aligned according to the longitudinal direction of the machine and divided into two groups or halves, of which a first group of rings are fixed in their locations, and a second group of rings are able to move according to an upward/downward movement with respect to the fixed rings.

This configuration allows the stuck foreign bodies to be released by applying an upward or downward movement to the group of moving rings, which generates a variation of the separation distance existing between said moving rings and fixed rings, so that the stuck body can be descaled.

With this configuration of the receptacle it is also possible to adjust the separation between the rings according to the needs of the machine in accordance to the type and size of the fruit, thus being also possible to process different types of fruit with a single machine.

However, in practice this machine still presents certain problems of jams due to shells or foreign matter that cannot be so easily removed with the upward-downward movement of the group of mobile rings, since the path of the second group of mobile rings is too short and therefore it is not enough for the unlocking of certain longitudinal elements such as any twig that may be introduced to the machine together with the fruits. Therefore, in these cases it is still necessary to stop the machine and disassemble it in order to carry out said cleaning work.

[ools] The above reduces the performance and operability of the machine and increases the operation costs. In addition, the ring shape of the receptacle presents constructive difficulties, since the welds are more complicated when there are curved shapes. All this affects the price of these machines.

In addition, the ring shape of the bars create a greater difficulty in achieving a certain separation space between the bars.

No fruit processing machine has been found in the state of the art capable of handling foreign matter and shells and that in the case of a jam it allows a quick and easy cleaning.

SUMMARY OF THE INVENTION

The machine for integral processing of fruits with a hard or soft shell disclosed herein comprises a feed hopper and at least a first receptacle having a first end for connection to said hopper and a second opposite end. The receptacle is positioned horizontally according to the longitudinal direction of the machine and comprises in its interior a central shaft positioned in accordance to the longitudinal direction of the machine and connected at one end to a rotating means.

Said central shaft has finger-shaped elements radially projected outward from various longitudinal positions thereof.

In this machine, the at least one first receptacle comprises a first and a second sides each formed by a flat laminar element in the shape of a circular crown with outer and inner diameters, such that they allow the central shaft to pass through both mentioned sides, and a plurality of bars parallel and equidistant from the central shaft.

Said bars are arranged adjacent to each other, such that each bar is separated from each of the two bars adjacent thereto by a separation space. Likewise, said bars have first and second opposite ends respectively attached to the laminar element of the first and second sides, in the space existing between said outer and inner diameters thereof by a fastner having different adjustment positions located to a greater or lesser distance from the central shaft, such that by increasing or decreasing the distance from the bars to said central shaft, the separation space between the bars is respectively increased or reduced.

With the machine for integral processing of fruits with a hard or soft shell as proposed herein, a significant improvement is obtained with respect to the current state of the art in order to solve jams and improve the operability of those machines intended to process fruits with a hard or soft shell.

This is so thanks to the fact that bars are arranged in a variable concentricity setting by being attached to the sides by the fastener with different adjustment positions making possible to regulate the distance of separation of the bars with respect to the rotating central shaft and so it is also possible to adjust the receptacle of the machine so that it can be effective in the processing of different fruits, according to their type and size of the last. Said fastening and adjustment means may be also any others existing in the state of the art, such as hardware system or the like, or by means of notches spaced as different distances in which adjusting guides or similar means are engaged or coupled.

Said adjustment means can be operated individually, jointly with all of them or only several at the same time. The operation of said adjustment means can be in a manual or automatic way, by means or one motor or motors coupled to the mentioned adjustment means. Preferably, the bars can be moved/adjusted all at once, if the higher performance adjustment is intended.

That is to say, the closer the bars are to the shaft, the smaller is the separation space between them and therefore the smaller is the space of passage for the fruits, while if the position of the bars on the means attaching their ends is modified and they become located further away from the central shaft, the separation space between them increases.

It can be detected that a jam has occurred in the machine by monitoring the mechanical torque and/or electrical consumption or the motor (in accordance to its speed) or the relationship between active power and apparent power. A jam can be also detected by a visual check. For example, by making the housing of the receptacle in a transparent material or said receptacle having chambers inside, preferable with a system of chambers with Artificial Intelligence (AI) to detect the machine status. Another option or detecting jams inside the machine is having sensors in the receptacle able to send orders to those bars next to the jam or all the bars together that, by means or motors coupled to them will change position to release the retained material causing the jam. The option or the sensors can be used for all the above mentioned jamming detection alternatives, whether using mechanical, electrical or per-view systems monitoring or by using artificial intelligence.

Cleaning intervals can be also assumed depending on the operation time and the conditions or the processed product. A further way for monitoring the status of the machine would also be the direct sampling at the machine's outputs, what could also give an indicating of the obstruction state or the suitability of the current setting.

In this way, the machine herein is effective for a range of sizes and types of fruits, this range being greater or lesser depending on the number of adjustment positions provided by the fastener of the bars, thus achieving that it is not necessary to arrange for a machine for each type and size of the fruit, with considerable saving in the space necessary for its location and in the cost associated to the need of having a separate machine for each type of fruit.

The present machine is therefore a versatile and effective machine that in a simple way allows to modify the space of passage or separation between bars.

Thus, it is also possible likewise to modify the space of passage when there is an element stuck between the bars, achieving in this way this to be released without having to disassemble any parts of the machine and in a simple way. Thus, even when having a certain space of passage an inlay of some foreign element occurs, the position of the bars can be varied to modify the space of passage and thus causing the embedded element to be released.

With this configuration of bars, it is possible to get a greater play of movement between the bars to avoid having to resort to disassemble parts of the machine with certain sizes of foreign elements. On the other hand, although for the modification of the separation space depending on the type and size of fruit all the bars approach or move away with respect to the central shaft, in the case of jam of a foreign element, it is possible to move a single bar, bringing it closer or further away, so that a space of passage can be generated between the bar that moves and the adjacent bars which is significantly larger than when all the bars are moved, so existing a greater set of distances to avoid the jam of elements.

On the other hand, this configuration of the bars in a parallel and equidistant way to the shaft and not in the spiral or circular form, provides a greater simplicity of manufacture, since welds with straight bars are much simpler than with circular or curved bars.

Therefore, the present machine is very efficient and simple to manufacture, thus allowing to perform cleaning tasks thereof in a fast and simple way without having to disassemble any part of the machine, thereby increasing its production and performance. In addition, it allows its capability to be regulated in order to carry out the processing of different types of fruits with the same machine, achieving a significant saving in materials, production costs and other costs related to the need of space where said machines are to be located.

BRIEF DESCRIPTION OF THE DRAWINGS

In order to help for a better understanding of the features of the invention, according to a preferred example of practical implementation thereof, a set of drawings is provided as an integral part of said description, in which, for illustrative and non-limiting purposes, is represented the following:

FIGS. 4.1, 4.2, and 4.3 show respective plan, elevation and profile views of the receptacle in FIG. 3, included in the machine for the integral processing of fruits with hard or soft shell, according to a preferred embodiment of the invention.

FIGS. 6.1, 6.2, and 6.3 show respective plan, elevation and profile views of the receptacle in FIG. 5, in the machine for the integral processing of fruits with hard or soft shell, according to a preferred embodiment of the invention.

DETAILED DESCRIPTION OF THE INVENTION

In view of the Figures included, it can be seen that in a preferred embodiment of the invention, the machine (1) for integral processing of fruits with hard or soft shell proposed herein comprises a feed hopper (2) and at least a first receptacle (3) having a first end (3.1) for connection to said hopper (2), and a second opposite end (3.2).

Said first receptacle (3) is located horizontally according to the longitudinal direction of the machine (1) and comprises in its interior a central shaft (4) positioned according to the longitudinal direction of the receptacle and connected at one end (4.1) to rotating means that have finger-like elements (5) radially projected outward from various longitudinal positions of said shaft (4).

Said first receptacle (3) comprises a first and a second side (6.1, 6.2), each formed by a flat laminar element in the shape of a circular crown with an outer and an inner diameter, such that they allow the central shaft (4) to pass through said sides, and a plurality of bars (8) parallel and equidistant from the central shaft (4), arranged adjacent to each other such that each bar (8) is separated from each of the two bars (8) adjacent to it by a separation space (9).

Figure 3:
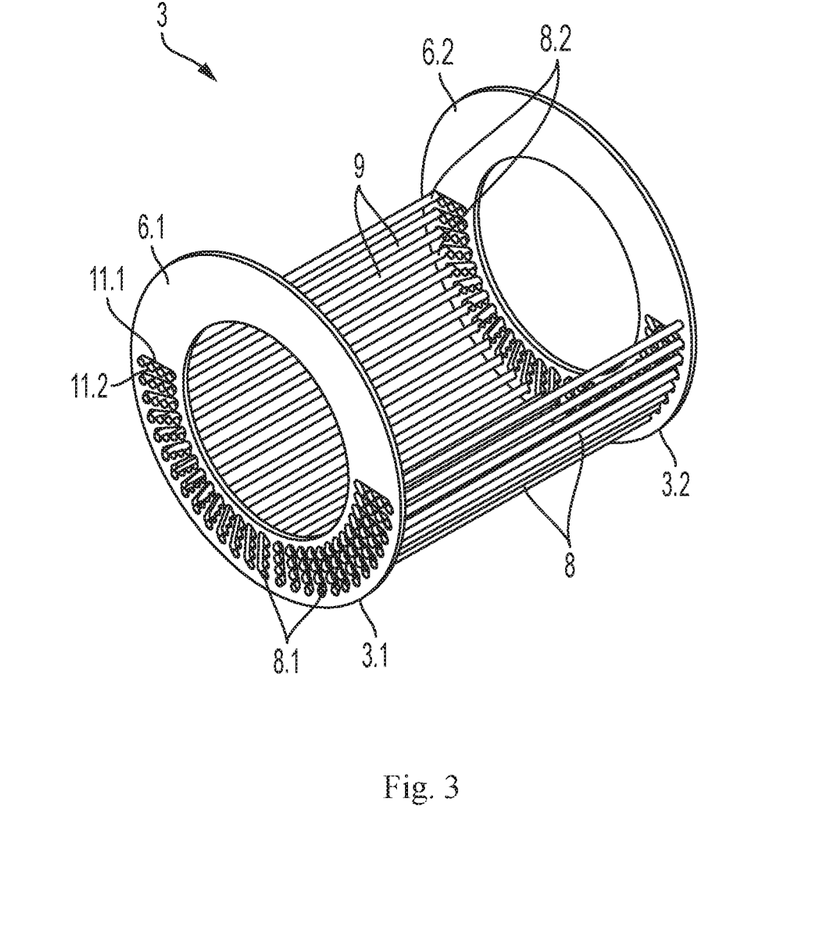
FIG. 3 shows a perspective view of a receptacle, where only the bars of the lower half are represented, these being in a position of maximum distance to the central shaft in the machine for the integral processing of fruits with a hard or soft shells, according to a preferred embodiment of the invention.
Figure 5:
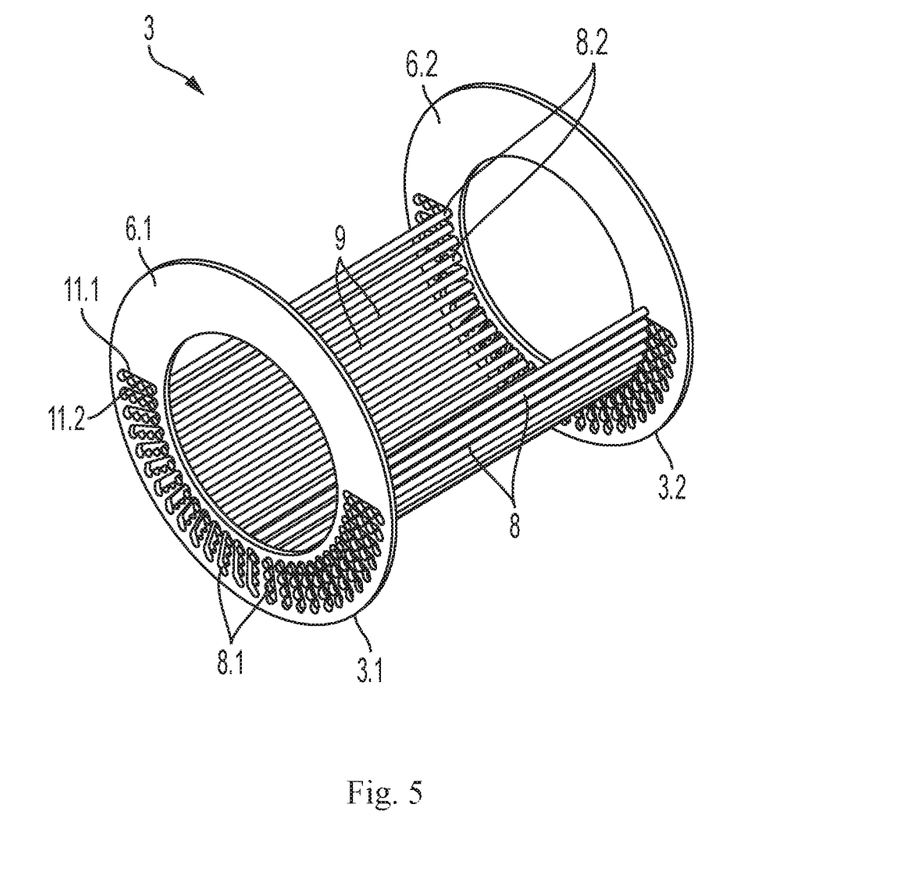
FIG. 5 shows a perspective view of the receptacle, where only the bars of the lower half have represented, these being in a position of minimum distance to the central shaft of the machine for the integral processing of fruits with hard or soft shell, according to a preferred embodiment of the invention.

As shown in FIGS. 3, 4.1, 4.3, 5, 6.1 and 6.2, said bars (8) have a first and second opposite ends (8.1, 8.2) attached to the laminar element of both first and second sides (6.1, 6.2) respectively, in the space between the outer and inner diameters thereof by means of fastener having different adjustment positions located at greater or lesser distance from the central shaft (4). Thus, by increasing the distance of the bars (8) from said central shaft (4), as shown in FIGS. 3 and 4.1 to 4.3, the separation space (9) between said bars (8) is increased, while if said distance of the bars (8) from the central shaft (4) is reduced, as shown in FIGS. 5 and 6.1 to 6.3, said separation space (9) decreases.

Figure 2:
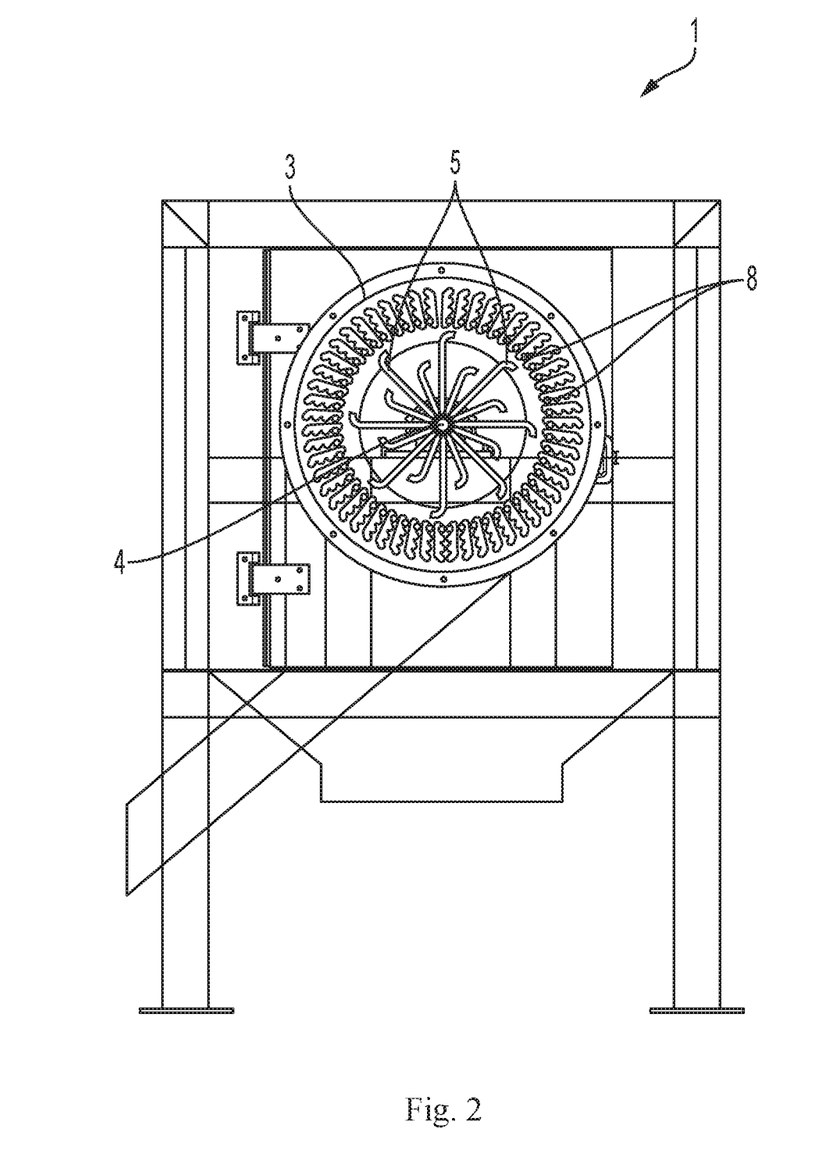
FIG. 2 shows a sectional view of the machine for integral processing of fruits with a hard or soft shell, according to a preferred embodiment of the invention.

In this preferred embodiment of the invention, as can be seen in FIGS. 2, 3, 4.2, 5 and 6.2, the fastener of the first and second ends (8.1, 8.2) of each one of the bars (8) are formed by two longitudinal adjustment guides (10) radially positioned in the space between the outer and inner diameters of the laminar element of the first and second sides (6.1, 6.2), respectively.

Figure 7:
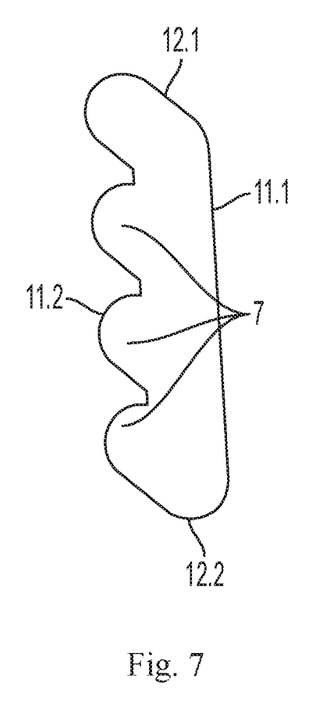
FIG. 7 shows an elevation view of an adjustment guide in the machine for the integral processing of fruits with hard or soft shell, according to a preferred embodiment of the invention.
Figure 41:
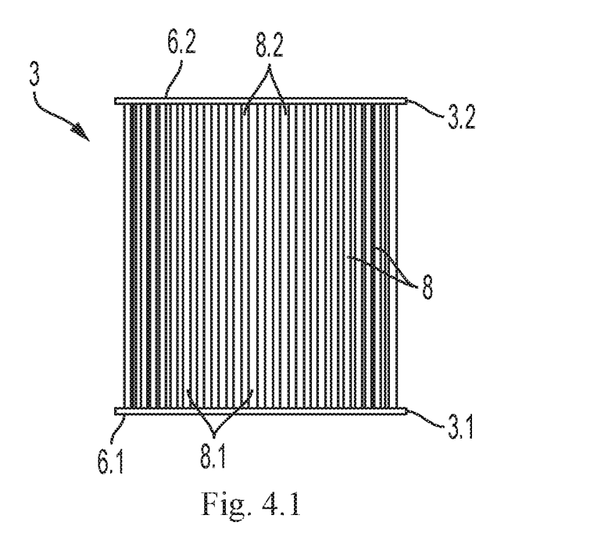

As can be seen in FIG. 7, said adjustment guides (10) have a first and second sides (11.1, 11.2) in accordance with the radial direction, and a first and second ends (12.1, 12.2) where the first end (12.1) is the one located closer to the inner diameter of the corresponding side. Likewise, each of the adjustment guides (10) comprises at least two circular notches (7) on one of its sides, with a size suitable for fitting on them one end (8.1, 8.2) of the bar (8). In this embodiment, the adjustment guides (10) comprise four circular notches (7), thus allowing four positions of the bars (8) and therefore four possible distances from these to the central shaft (4).

Figure 42:
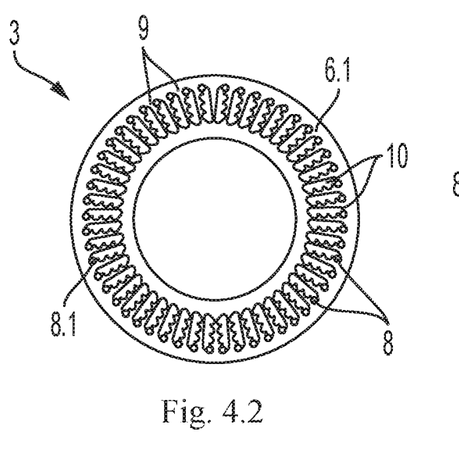
Figure 43:
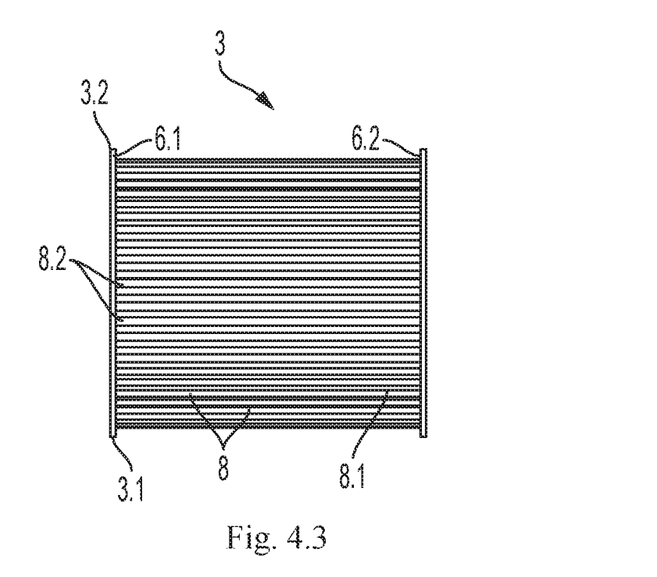
Figure 61:
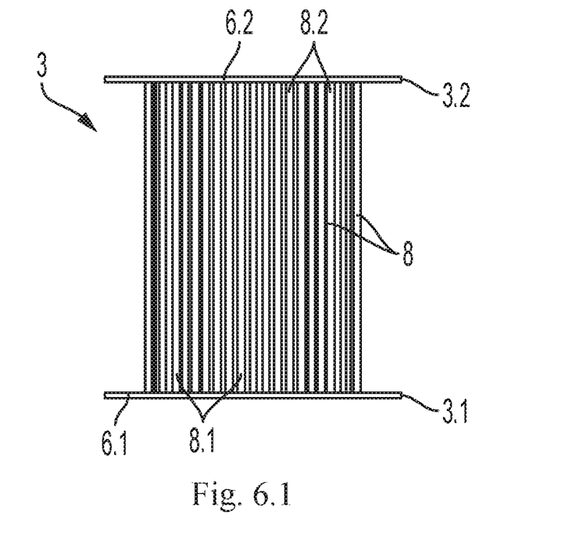
Figure 62:
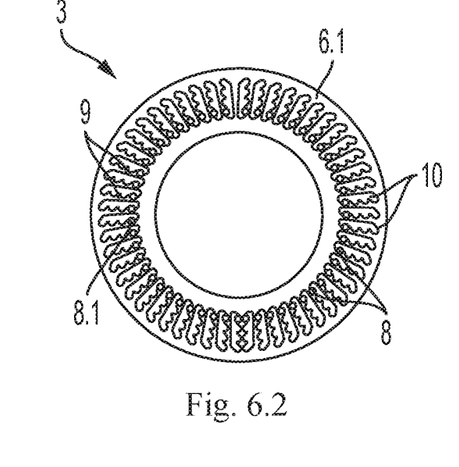
Figure 63:
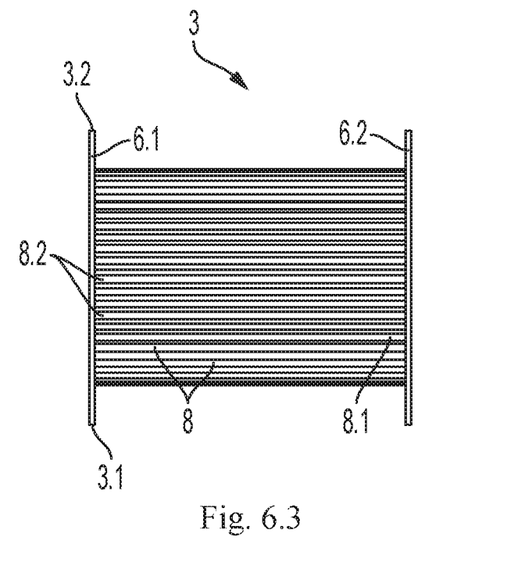

In this preferred embodiment, as shown in FIGS. 4.2 and 6.2, the arrangement of the adjustment guides (10) in both first and second sides (6.1, 6.2) of the receptacle is symmetrical with respect to a central vertical axis of the corresponding side, and the circular notches (7) of the adjustment guides (10) in the lower half of each first and second sides (6.1, 6.2) are arranged on the side (11.1, 11.2) of said adjustment guides (10) closest to the vertical axis and/or located inferiorly to the other side, while in the upper half of both first and second sides (6.1, 6.2) said notches are arranged on the side (11.1, 11.2) of the adjustment guides (10) furthest from the vertical axis and/or located inferiorly to the other side.

Figure 1:
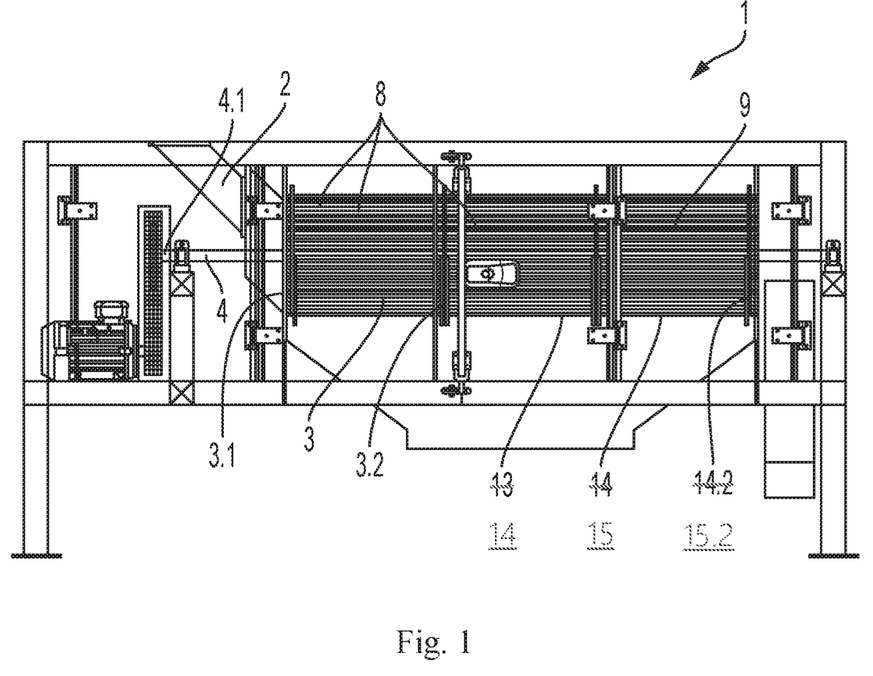
FIG. 1 shows a profile view of a machine for integral processing of fruits with a hard or soft shell, according to a preferred embodiment of the invention.

In this embodiment, as shown in FIG. 1, the machine (1) has a second and a third receptacles (14, 15) located horizontally with respect to the longitudinal direction of the machine (1), following the first receptacle (3) and connected to it.

Thus, in this preferred embodiment of the invention, the separation space (9) between the bars (8) of all the receptacles (3, 14, 15) is the same, but in other embodiments it may occur that at least one of the receptacles to have a separation space (9) different from that of the other receptacles, depending on the type of fruit and its behavior.

On the other hand, in this embodiment, the second side (15.2) of the receptacle (15) located further away from the connection to the hopper (2) comprises an outlet opening (not shown in the Figures) fitted with closing means formed by a gate and means to control it. In this way, peels and shells can be removed in a controlled manner, when deemed necessary to avoid jams inside the machine (1).

The described embodiment constitutes only an example of the present invention. Therefore, the specific details, terms and phrases used herein are not to be considered as limiting, but are only to be understood as a basis for the claims and as a representative basis that provides an understandable description as well as sufficient information for a person skilled in the art to apply the present invention.

What is claimed is:

1. A machine for integral processing of fruits with hard or soft shell, comprising: a feed hopper and at least a first receptacle having a first end for connection to said hopper and a second opposite end, wherein said receptacle is positioned horizontally according to the longitudinal direction of the machine and comprises in its interior a central shaft positioned according to the longitudinal direction thereof and connected at one end to a rotating element, with said central shaft having finger elements radially projected outward from various longitudinal positions of said shaft;

wherein the at least one first receptacle is static and comprises a first and a second sides, each formed by a flat laminar element in the shape of a circular crown with an outer and an inner diameter to allow the central shaft to pass through said sides; and a plurality of bars parallel and equidistant from the central shaft and arranged adjacent to each other, such that each bar is separated from each of the two bars adjacent to it by a separation space and where said bars have a first and a second opposite ends respectively attached to the laminar element of the first and second sides, in the space between the outer and inner diameters thereof by a fastener that has different adjustment positions arranged at a greater or lesser distance from the central shaft, such that by increasing or decreasing the distance of the bars with respect to said central shaft, the separation space between the bars is respectively increased or reduced.

2. A machine for integral processing of fruits with hard or soft shell according to claim 1, wherein the fastener of the first and second ends of each one of the bars are provided by longitudinal adjustment guides radially positioned in the space between the outer and inner diameters of the laminar element in the first and second sides, respectively, where each adjustment guide has first and second sides in accordance with the radial direction, and first and second ends where the first end is the one located closest to the inner diameter of the corresponding side, and where each of the adjustment guides comprise at least two circular notches on one of the sides that have a size suitable for fitting one end of the bar into them.

3. A machine for integral processing of fruits with hard or soft shell according to claim 2, wherein the position of the adjustment guides of each first and second sides of the receptacle are symmetrical with respect to a central vertical axis of the corresponding side of the receptacle.

4. A machine for integral processing of fruits with hard or soft shell according to claim 1, further comprising at least a second receptacle located horizontally in accordance with the longitudinal direction of the machine, following the first receptacle and connected to it.

5. A machine for integral processing of fruits with hard or soft shell according to claim 4, wherein the separation space between the bars in at least one of the receptacles is different than that of the other receptacles.

6. A machine for integral processing of fruits with hard or soft shell according to claim 1, wherein the second end of the receptacle located further away from the connection to the hopper comprises an outlet opening fitted with a gate and controller therefor.

7. A machine for integral processing of fruits with hard or soft shell, comprising: a feed hopper and at least a first receptacle having a first end for connection to said hopper and a second opposite end, wherein the first receptacle is static and wherein said receptacle is positioned horizontally according to the longitudinal direction of the machine and comprises in its interior a central shaft positioned according to the longitudinal direction thereof and connected at one end to a rotating element, with said central shaft having finger elements radially projected outward from various longitudinal positions of said shaft;

wherein the at least one first receptacle comprises a first and a second sides, each formed by a flat laminar element in the shape of a circular crown with an outer and an inner diameter to allow the central shaft to pass through said sides; and a plurality of bars parallel and equidistant from the central shaft and arranged adjacent to each other, such that each bar is separated from each of the two bars adjacent to it by a separation space and where said bars have a first and a second opposite ends respectively attached to the laminar element of the first and second sides, in the space between the outer and inner diameters thereof by a fastener that has different adjustment positions arranged at a greater or lesser distance from the central shaft, such that by increasing or decreasing the distance of the bars with respect to said central shaft, the separation space between the bars is respectively increased or reduced.

8. A machine for integral processing of fruits with hard or soft shell according to claim 7, wherein the fastener of the first and second ends of each one of the bars are provided by longitudinal adjustment guides radially positioned in the space between the outer and inner diameters of the laminar element in the first and second sides, respectively, where each adjustment guide has first and second sides in accordance with the radial direction, and first and second ends where the first end is the one located closest to the inner diameter of the corresponding side, and where each of the adjustment guides comprise at least two circular notches on one of the sides that have a size suitable for fitting one end of the bar into them.

9. A machine for integral processing of fruits with hard or soft shell according to claim 7, wherein the position of the adjustment guides of each first and second sides of the receptacle are symmetrical with respect to a central vertical axis of the corresponding side of the receptacle.

10. A machine for integral processing of fruits with hard or soft shell according to claim 7, further comprising at least a second receptacle located horizontally in accordance with the longitudinal direction of the machine, following the first receptacle and connected to it.

11. A machine for integral processing of fruits with hard or soft shell according to claim 10, wherein the separation space between the bars in at least one of the receptacles is different than that of the other receptacles.

12. A machine for integral processing of fruits with hard or soft shell according to claim 7, wherein the second end of the receptacle located further away from the connection to the hopper comprises an outlet opening fitted with a gate and controller therefor.

* * * * *